US012231752B2

(12) United States Patent
Rekstad, Jr. et al.

(10) Patent No.: US 12,231,752 B2
(45) Date of Patent: Feb. 18, 2025

(54) DEVICE TEMPERATURE CONTROL USING DEVICE COMPONENTS

(71) Applicant: Comcast Cable Communications, LLC, Philadelphia, PA (US)

(72) Inventors: Gary Michael Rekstad, Jr., Langhorne, PA (US); Vijayanand Dubey, Downingtown, PA (US); Joseph Frank, Medford, NJ (US); Uday Krishna Garpathi, Downingtown, PA (US); Benny Pruden, Brownstown, PA (US); Joseph Thomas Rodolico, Horsham, PA (US); Christopher Stone, Newtown, PA (US); David Urban, Cinnaminson, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 21 days.

(21) Appl. No.: 18/156,768

(22) Filed: Jan. 19, 2023

(65) Prior Publication Data

US 2024/0251146 A1 Jul. 25, 2024

(51) Int. Cl.
*H04N 23/52* (2023.01)
*H04N 23/23* (2023.01)

(52) U.S. Cl.
CPC ............ *H04N 23/52* (2023.01); *H04N 23/23* (2023.01)

(58) Field of Classification Search
CPC ....... H04N 23/23; H04N 23/52; G01S 7/4047
See application file for complete search history.

(56) References Cited

U.S. PATENT DOCUMENTS 8,400,502 B2  3/2013  Zakrzewski et al.
9,659,237 B2  5/2017  Puetter et al.
(Continued)

FOREIGN PATENT DOCUMENTS

CN        2844829 Y    12/2006
CN      106450572 B    10/2018
(Continued)

OTHER PUBLICATIONS

N.N. Khan and M.M. Ahmed, Weather and surface condition detection based on road-side webcams: Application of pre-trained Convolutional Neural Network, International Journal of Transportation Science and Technology 11, (2022), pp. 468-483, University of Wyoming, Department of Civil & Architectural Engineering, Laramie, WY 82071, United States.
(Continued)

*Primary Examiner* — Lin Ye
*Assistant Examiner* — Chriss S Yoder, III
(74) *Attorney, Agent, or Firm* — Banner & Witcoff, Ltd.

(57) ABSTRACT

Systems, apparatuses, and methods are described for using one or more components of a device, such as a camera, to generate complementary heat for the device, such as a camera lens of the device. In one aspect this can be accomplished by activating the one or more components and/or by causing the one or more components to operate in a particular manner expected to generate heat. The generated heat may be instead of or in addition to heat generated by one or more dedicated heaters. The selected components may produce heat as an incidental effect for performing other functions of the device.

37 Claims, 7 Drawing Sheets

(56) References Cited

U.S. PATENT DOCUMENTS

| | | | | |
|---|---|---|---|---|
| 10,499,017 | B2* | 12/2019 | Dellock | H04N 7/183 |
| 10,863,061 | B2* | 12/2020 | Uetsuji | G03B 17/08 |
| 10,928,629 | B2* | 2/2021 | Ohsumi | G03B 30/00 |
| 11,218,045 | B2 | 1/2022 | Yang et al. | |
| 2007/0267400 | A1 | 11/2007 | Chen et al. | |
| 2014/0009619 | A1* | 1/2014 | Koppe | G02B 27/0006 |
| | | | | 348/148 |
| 2015/0160536 | A1* | 6/2015 | Lang | G03B 17/55 |
| | | | | 348/374 |
| 2018/0162323 | A1 | 6/2018 | Hong et al. | |
| 2021/0250484 | A1* | 8/2021 | Wang | H05B 3/84 |

FOREIGN PATENT DOCUMENTS

| | | |
|---|---|---|
| CN | 209748678 U | 12/2019 |
| TW | M555930 U | 2/2018 |

OTHER PUBLICATIONS

Mihai Negru, Autonomous Driving in Adverse Weather Conditions Case Study—FOG, Book, (2019), 153 pages, ISBN 978-606-737-358-5, UTPRESS, Cluj-Napoca, Romania.

* cited by examiner

DEVICE TEMPERATURE CONTROL USING DEVICE COMPONENTS

BACKGROUND

Device components can be affected by temperature changes. For example, camera lenses can fog up when there is moisture inside a camera. The moisture may condense on the lens to make the lens foggy. These and other shortcomings are identified and addressed by the disclosure.

SUMMARY

The following summary presents a simplified summary of certain features. The summary is not an extensive overview and is not intended to identify key or critical elements.

Camera lenses can fog up when there is moisture inside a camera. The moisture condenses on the lens to make the lens foggy, often at initial startup or after being off for some time, particularly in a cold environment. The fog can dissipate after hours of normal usage as the camera's electronics heat up, but not if there is too much condensation. While the lens is foggy, image quality can suffer until this slow warm-up phase has completed. In addition, a cold environment can contribute to making other components of the camera cold, sometimes too cold to operate properly. For example, if the camera has not been actively used in a while, the camera's battery may be in a cold condition such that the battery is not able to adequately and safely charge or discharge.

Systems, apparatuses, and methods are described for heating one or more portions of a device using one or more components of the device, such as but not limited to a camera lens, a battery, and/or any other component of the device. The device may be any device. For example, the device may be or otherwise include a camera, and may comprise a plurality of components, such as a lens, a battery, one or more processors, one or more lights (for example, infrared lights), one or more speakers, one or more wireless interfaces, one or more wired interfaces, and/or other circuitry. The device may also comprise one or more heaters that are dedicated to generating heat and that may not perform any additional useful function of the device. For example, the device may comprise a battery heater configured to apply heat to the battery and/or a lens heater configured to apply heat to the lens (which may cause condensation on the lens to dissipate more quickly). Under some conditions, such as a cold environment, the battery heater (if existing) may be inadequate to sufficiently heat the battery at a desired pace. Similarly, the lens heater (if existing) may be inadequate to sufficiently heat the lens to quickly dissipate condensation that may have accumulated on the lens to make the lens foggy, thereby preventing the lens from transferring an image clearly to an image sensor. Moreover, such heaters may expend a relatively large amount of energy to generate heat, without necessarily accomplishing, supporting, or performing other desired functions of the camera. In contrast, other components of the device that perform functions of the device, such as processing, user interface, and/or image taking functions, may generate heat as an incidental effect of their performing their normal functions. For example, the one or more processors of the device may be expected to generate a certain amount of heat while performing their normal processing functions, and one or more lights may generate some heat when producing light (such as one or more infrared light-emitting diodes that may be used for enhancing images taken in a dark environment). Thus, it may be desirable to use one or more of these other component of the device to generate complementary heat for the battery, the lens, and/or any other portion of the device, by activating the one or more components and/or by causing the one or more components to operate in a particular manner expected to generate additional heat. Those other components may serve other purposes, such as to implement other functions of the device. For example, whereas the one or more processors may generate a first amount of heat when operating at a first speed (e.g., at a first clock rate), the one or more processors may generate a larger second amount of heat when operating at a faster second speed (e.g., at a faster second clock rate). The one or more components may be the sole source of heat or they may be used to supplement heat provided by the battery heater and/or the lens heater.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
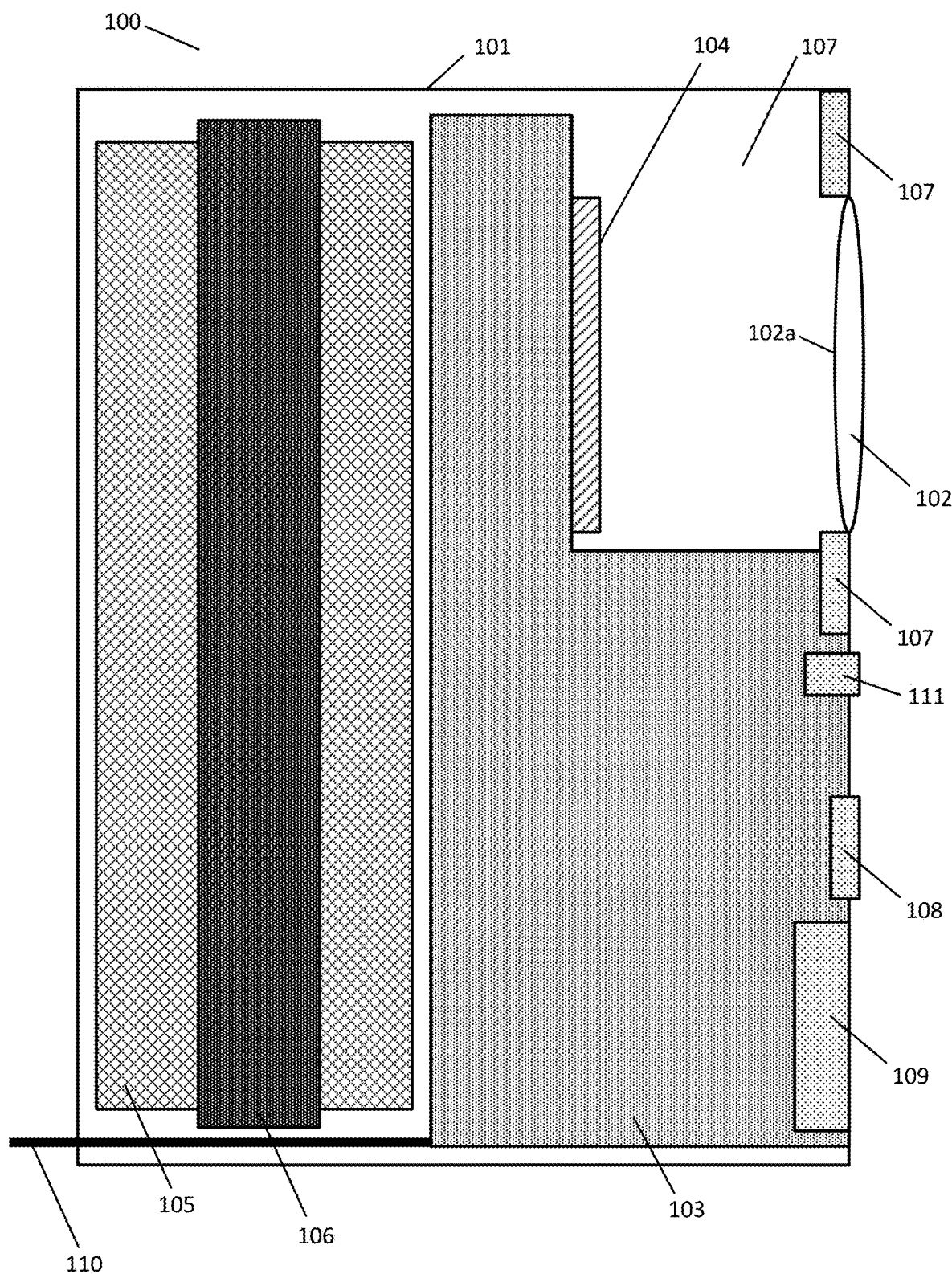
FIG. 1 shows a cross section of an example device that comprises a camera, in accordance with aspects as disclosed herein.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows a cross section of an example of a device 100. While the various components of the device 100, and the device 100 itself, are shown to have particular shapes, these shapes are merely examples and may vary as desired. The device 100 may be or include any type of device, such as an electronic doorbell or a security camera. While the device 100 is described below as comprising components such as a camera, microphone, housing, heaters, buttons, circuitry, and a speaker, the device 100 does not necessarily need to have any particular ones of these elements. For example, the device 100 may be missing the camera, the speaker, and/or the microphone, and/or may comprise other components. The device 100 may be portable or may be intended to be in a single location, such as affixed to a building or other structure.

The device 100 may comprise a housing 101 that may partially or fully contain any of a variety of components. The housing 101 may be water-resistant or water-proof Device 100 may comprise components such as a camera, which may comprise a lens 102 (which may be a lens system comprising a plurality of lens elements) and an optical sensor such as an image sensor 104 disposed to receive light that originates from outside the housing 101 and that passes through the lens 102. The device 100 may comprise circuitry 103 for operating one or more functions of the device 100. The circuitry 103 may comprise, for example, one or more processors, memory, integrated circuit chips, and/or other electronic components, as well as one or more power components for transferring signals having relatively higher power (e.g., higher electrical voltage and/or current) and/or for converting between higher power and lower power electrical signals, such as a transformer configured to receive and convert external power to onboard electrical component voltages (e.g., to convert 120V to 12V or 5V). The device 100 may comprise at least one battery 105 for powering the circuitry 103 and/or other components of the device 100. The battery 105 may be a rechargeable or non-rechargeable battery, and may power the device 100 when the device 100 is not receiving external power or to supplement the external power.

The device 100 may comprise one or more heaters for providing heat to one or more components of the device 100. For example, the device 100 may comprise a battery heater 106 that may be located near and/or in physical contact with the battery 105, such that the battery heater 106 may, when activated by the circuitry 103, heat at least a portion of the battery 105. As another example, the device 100 may comprise a lens heater 107 that may be located near and/or in physical contact with the lens 102, such that the lens heater 107 may, when activated by the circuitry 103, heat at least a portion of the lens 102. Each of the heaters 106 and/or 107 may be, for example, an electrical resistive heater.

The device 100 may comprise one or more user input elements, such as one or more buttons (e.g., button 108). For example, where the device 100 is a doorbell, the circuitry 103 may sense that the button 108 has been pressed, and in response, cause an action such as by causing a doorbell ringer (connected to the device 100 or internal to the device 100) to ring. The device 100 may comprise one or more output elements, such as a speaker 109 and/or a light-emitting diode (LED) 111 or an array of LEDs (such as one or more infrared LEDs and/or one or more visible light LEDs) configured to emit light to thereby illuminate a region outside of the device 100 (for example, to illuminate an external environment of the device 100). Other examples of output elements may include other types of lights, a display, a buzzer, an electrical and/or optical signal port, and/or a haptic interface motor. For example, where the device 100 is a doorbell, the circuitry 103 may cause the speaker 109 to produce sound in response to the button 108 being pressed (for example, by causing the speaker to emit a doorbell ringing sound or a voice).

Although the device 100 may comprise one or more heaters such as the battery heater 106 and/or the lens heater 107, any of the other components may incidentally produce heat as well as part of performing one or more other functions. For example, one or more components of the device 100 may be configured to perform a processing function of the device 100, such as any processors of the circuitry 103, and may produce heat as a result of the one or more components performing their respective functions (e.g., processing data or other signals). As another example, one or more components of the device 100 may normally perform a user interface function of the device 100 (e.g., producing sound, producing an indication light, presenting other information to a user, and/or receiving sound or other information from a user), such as the speaker 109, and as a result of performing the user interface function may produce heat. As yet another example, one or more components of the device 100 may be configured to perform another function of the device 100 such as generating light to enhance imaging by the image sensor 104, such as the light 111, and as a side effect of generating light (for example, due to imperfect electric power to optical power conversion) may produce heat when the one or more components are performing their respective (e.g., primary) functions. Any of these components may, as a result of performing their respective functions, produce heat that may be sufficient to heat any portion of the device 100, such as the battery 105, and/or to partially or fully remove the condensation from the inner surface 102a of the lens 102.

As will be described in further detail herein, heating the battery 105 (using the battery heater 106 and/or using another component of the device 100 located near the battery 105) may provide certain benefits such as improved charging and/or discharging performance of the battery 105. Moreover, heating the lens 102 (using the lens heater 107 and/or using another component of the device 100) may cause any condensation that has formed on the lens 102 to be reduced or even completely removed, thereby potentially allowing the lens 102 to transmit light with less distortion. Condensation may form on the lens 102 for a variety of reasons. For example, the housing 101 may be sealed such that an interior region 107 of the housing 101 is sealed from an external environment of the device 100. Depending upon how the device 100 is manufactured, there may be a certain amount of water vapor trapped in the interior region 107 when the housing 101 is sealed closed. If the device 100 operates in a sufficiently low temperature environment, this may cause one or more interior surfaces to cool, causing some of the water vapor trapped in the interior region 107 to condense onto those cooler one or more surfaces. One of those surfaces may include the interior surface 102a of the lens 102. When a lens has such condensation, such a lens may be opaque, or non-transparent, (e.g., cloudy) and is sometimes referred to as a fogged lens. When the lens 102 is fogged due to condensation, the condensation may distort light that passes through the fogged lens 102, thereby causing the image incident on the image sensor 104 to be distorted. One way to counteract (e.g., remove) the condensation from a surface is to apply heat to the surface, which allow the condensed water to re-vaporize. Thus, heating the lens 102, such as using the lens heater 107 and/or one or other components of the device 100, may cause some or all of the condensation to re-vaporize into the interior region 107 and thus no longer be condensed on the interior surface 102a of the lens 102, thereby potentially clearing ("defogging") the lens 102.

In addition to the battery 105 or as an alternative to the battery 105, the device 100 may comprise wiring 110 for receiving power from an external power source. The wiring 110 may transfer and distribute power received from the external power source into a transformer that may convert the power to an appropriate voltage and/or current that is usable by the circuitry 103.

Figure 2:
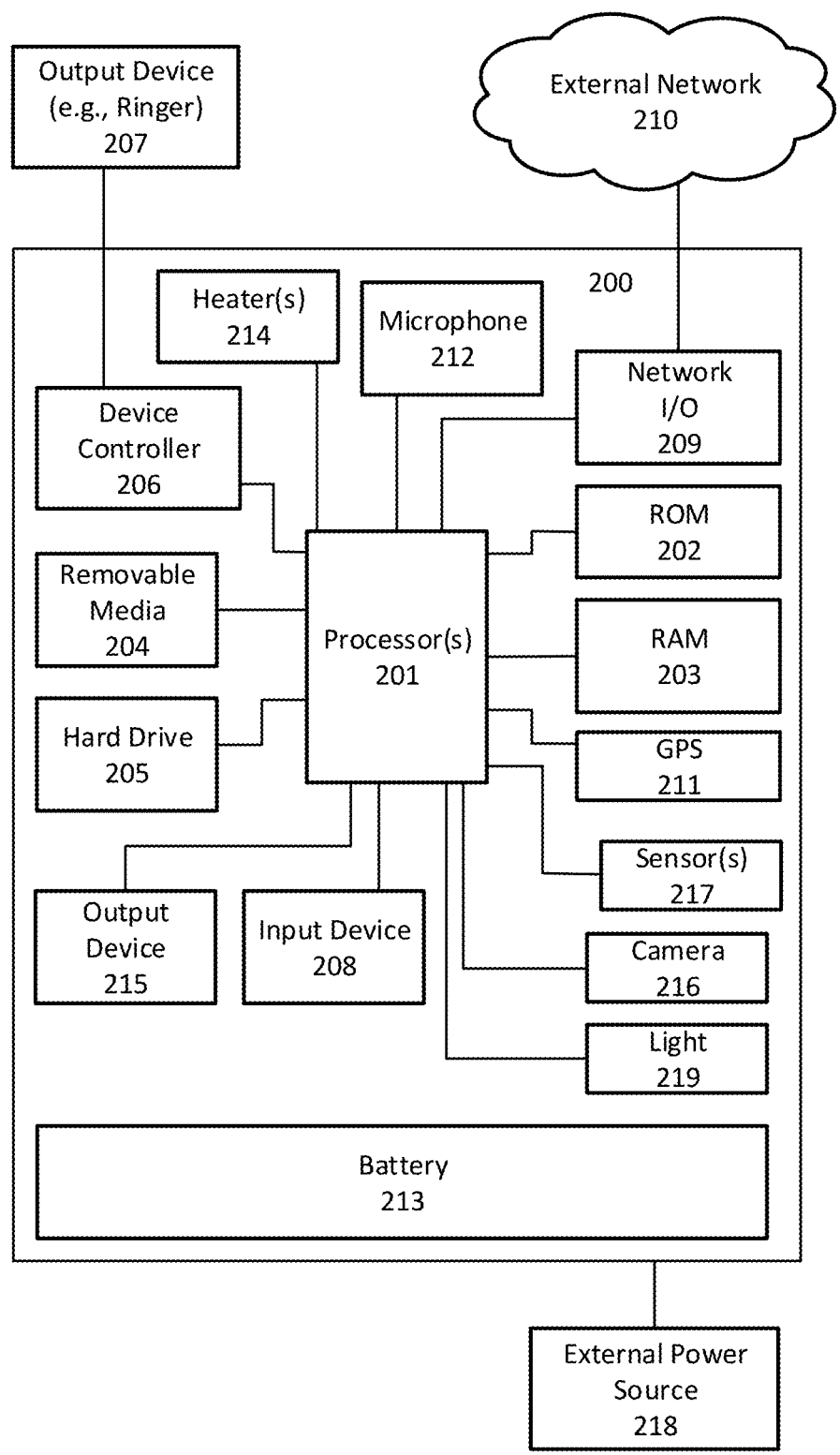
FIG. 2 shows an example device that may be used to implement an electronic device, such as the electronic device of FIG. 1.

FIG. 2 shows hardware elements of a computing device 200 that may be used to implement a portion of or all of a device such as the device 100 shown in FIG. 1. The computing device 200 may comprise one or more processors 201, which may execute instructions (such as instructions of a computer program) to perform any of the functions, steps, and actions described herein. For example, the instructions, when executed by the one or more processors 201, may cause the computing device 200 to perform any of the steps of any of FIGS. 3-6 and/or any other steps, functions, actions, and variations thereof, as described herein. The instructions may be stored in a memory, such as a read-only memory (ROM) 202, random access memory (RAM) 203, removable media 204 (e.g., a USB drive, a compact disk (CD), a digital versatile disk (DVD)), an attached or internal hard drive 205, and/or any other types of non-transitory computer-readable medium. The computing device 200 may be connected to one or more external output devices 207. The one or more external output devices 207 may be any type(s) of output device, such as a device that presents video (with or without audio) such as a display device (e.g., an external television and/or other external or internal display device), and/or a device that presents audio such as a speaker or a doorbell ringer. The computing device 200 may further comprise one or more other heaters 214, such the battery heater 106 and/or the lens heater 107. The one or more heaters 214 may be dedicated to producing heat. For example, the one or more heaters 214 may be configured to produce heat and not to perform any data processing functions. The computing device 200 may further comprise one or more output device controllers 206, such as a video processor, or a speaker driver or doorbell ringer driver that produces sufficient current and/or voltage to drive one or more output devices 207 and/or 215 such as a speaker or a doorbell ringer relay. The computing device 200 may further comprise or be connected to one or more user input devices 208, which may comprise, for example, a remote control, a keyboard or other button(s) (such as the button 108), a mouse, a touch screen (which may be integrated with the display device 206), microphone, etc. The computing device 200 may also comprise one or more network interfaces, such as a network input/output (I/O) interface 209 (e.g., a network card) to communicate with an external network 210. The network I/O interface 209 may be a wired interface (e.g., electrical, RF (via coax), optical (via fiber)), a wireless interface, or a combination of the two. The network I/O interface 209 may comprise or be connected to a modem configured to communicate via the external network 210. The external network 210 may comprise a large-scale wide-area network, a local area (e.g., in-home) network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200. The computing device 200 may further comprise one or more cameras 216, such as the camera of FIG. 1 that comprises the lens 102 and the image sensor 104. The computing device 200 may further comprise a battery 213, such as the battery 105 of FIG. 1. The computing device 200 may further comprise one or more sensors 217, such as one or more temperature sensors (for example, for detecting the temperature of the battery 105 and/or any other component of the device 100, and/or for detecting the temperature of the external environment of the device 100), vibration sensors, pressure sensors, and/or light sensors. The computing device 200 may further comprise one or more lights 219, such as the LED 111. The one or more lights 219 (e.g., LED 111) may emit light of any one or more wavelengths (e.g., colors). For example, the one or more lights 219 may be configured to emit infrared light outside the device 100, wherein the emitted light may be at least partially reflected back from one or more objects outside the device 100 back toward the camera 216 for forming an image thereof, even at night. The computing device 200 may be electrically connected to an external power source 218, such as via the wiring 110. The external power source 218 may be, for example, standard household power (e.g., 120V or 240V power) or any other power source.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. A memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. An IC may be configured to output image data to a display buffer. Where the device 100 comprises the computing device 200, the elements 201, 202, 203, 204, 205, 206, 208, 209, 211, 212, 213, 214, 215, 216, and/or 217 may be partially or fully implemented by, or in electrical (e.g., data or other signaling) communication with, the circuitry 103 of FIG. 1.

FIGS. 3-6 are flowcharts showing an method 300 that may be performed by one or more devices, such as by the device 100. Any or all of the steps of these flowcharts may be partially or fully performed, for example, by the one or more processors 201 executing instructions stored in memory (such as the ROM 202, the RAM 203, the removable media 204, and/or the hard drive 205). Any of the steps of the method 300 can be rearranged, combined, and/or omitted, and/or other steps can be added, as desired.

As will be described in greater detail, the method of FIGS. 3-6 may iteratively and/or selectively apply heat to one or more targeted component of the device 100, such as by applying heat to a battery and/or to a lens. The device 100 may test whether the heat being applied to the one or more targeted components is adequate to satisfy one or more criteria. For example, the device 100 may attempt to heat the battery 105 to at least a threshold temperature within a particular amount of time. As another example, the device 100 may attempt to heat the lens 102 to remove condensation from a fogged lens within a particular amount of time. If the heat being produced is inadequate to heat the targeted component to at least the threshold temperature, then the device 100 may select one or more components to apply additional heat to the targeted component. This process of selecting and activating further components to generate heat may be repeated until the one or more criteria are reached or are expected to be reached with a given amount of applied heat.

As will be also described in greater detail, the method of FIGS. 3-6 may further iteratively and/or selectively control one or more components of the device 100 to actively or passively cool one or more targeted components of the device 100. For example, the device may deactivate one or more active components to allow the battery 105 and/or the image sensor 104 to cool over time. The process may involve testing whether the targeted one or more components is/are being adequately cooled to satisfy one or more criteria. For example, the device 100 may attempt to cool the battery 105 and/or the image sensor 104 down to at least a threshold temperature within a particular amount of time. If the cooling is inadequate, then the device 100 may select one or more further components for deactivation to allow the targeted one or more components to cool more quickly. This process of selecting and deactivating (or activating) further components to provide a cooling effect may be iteratively repeated until the one or more criteria are reached or are expected to be reached with a given amount of cooling.

Figure 3:
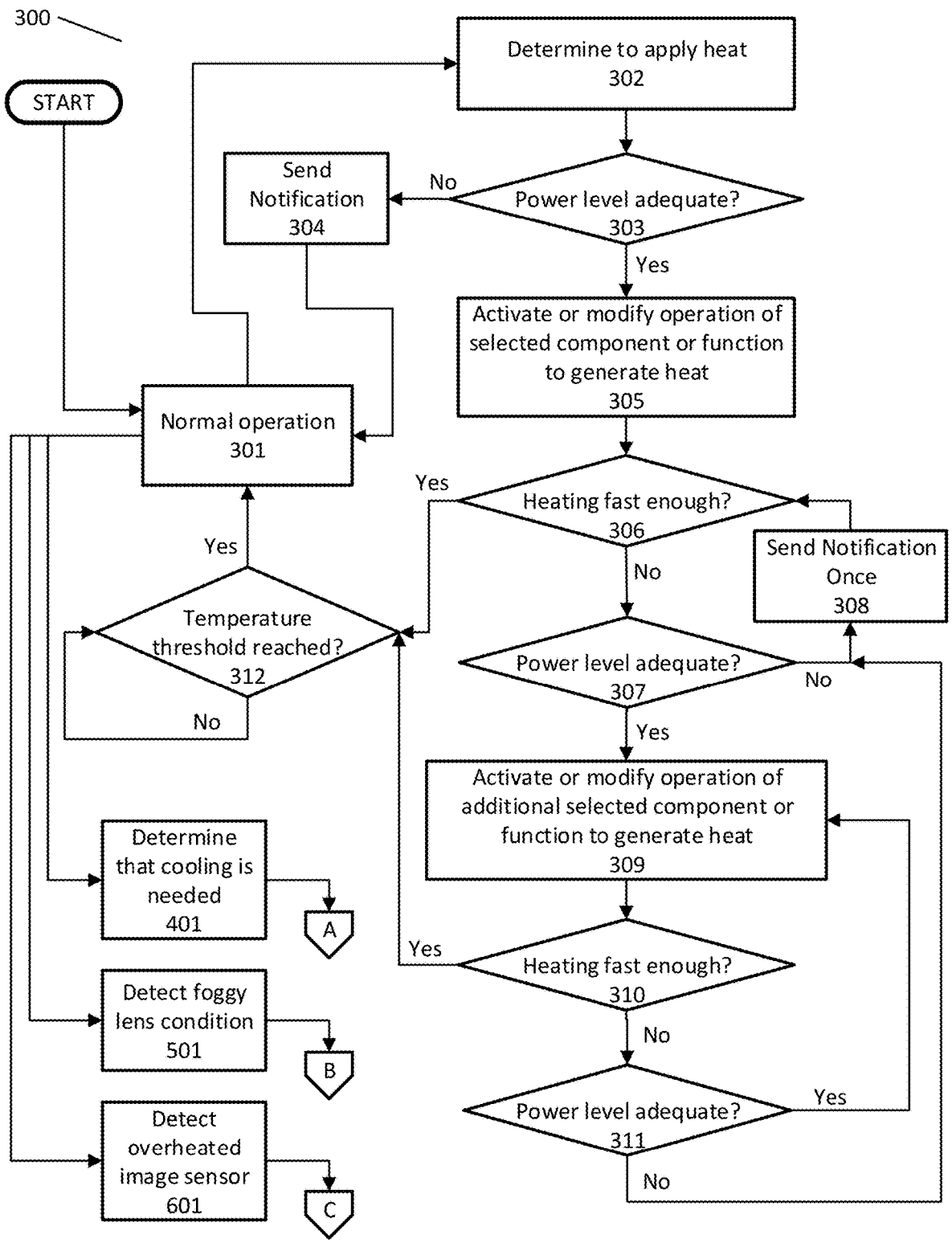
FIG. 3-6 are flowcharts showing an example method that may be performed by one or more devices, such as by the device of FIG. 1.

Referring to FIG. 3, the method 300 may start at step 301, in which the device 100 may be in what will be referred to herein as normal operation. Normal operation may be any operating mode (e.g., state or status) of the device 100, such as a standby mode, a monitoring mode, a sleep mode, a power-up mode, a power-down mode, an off mode, or an active processing mode. As another example, normal operation in step 301 may designate a situation in which the device 100 is not performing any of the other steps of the method 300. However, in further examples, the device 100 may continue to perform any tasks associated with normal operation in parallel with performing any of those steps.

Performing the method 300 may cause the device 100 to, for example, regulate a temperature of a component, such as a battery, lens, image sensor, and/or any other component of the device 100. For example, as shown in the flowchart of FIG. 3, the device 100 may heat the battery 105 if the battery 105 is detected to be in a cold condition. Although heating the battery 105 is discussed with respect to FIG. 3, any other components of the device 100 may be heated using the same or a similar process. At step 302, the device 100 may determine that heat is to be applied within or to the device 100. For example, the device 100 may detect that the battery 105 or some other component of the device 100, or some particular region of the device 100, is in a cold condition. In response to such a determination, the device 100 may determine that heat is to be generated. For example, the one or more sensors 217 may comprise a temperature sensor that is configured to detect a temperature of a component such as the battery 105. For example, if the temperature sensor measures the temperature of the component as being below a predetermined threshold temperature, the device 100 may determine that the component is in a cold condition. The component to be heated in the method of FIG. 3 will be referred to herein as a target component. The determination of step 302 may be performed for any reason, and not necessarily in response to a cold component or region being detected.

If it is determined that heat should be applied in step 302, step 303 may be performed. In step 303, the device 100 may determine whether the power level being provided by the battery 105 and/or an external power supply (such as being received via the wiring 110) is adequate for any tasks that the device 100 is performing, attempting to perform, or expects to perform. For example, the device 100 may need to operate a camera or it may expect to send a signal to a doorbell ringer. The power level may be measured based on, for example, the current and/or voltage being supplied by the battery 105 and/or external power supply. For example, if the voltage drops below a particular voltage threshold associated with the tasks being performed by the device 100, then the device 100 may determine that the power being supplied is inadequate. The voltage threshold may be determined, for example, by someone who installs the device 100 (e.g., connects the device 100 to external power), and that person may set the voltage threshold based on a characteristic of the external power being supplied, such as based on a specification of a transformer that may be used to convert power (e.g., from 120 volts to 12 volts) for supply to the device 100. As a further example, the voltage threshold may be determined automatically by the device 100 (e.g., by the one or more processors 201) as a result of monitoring the power supplied to the device 100 under various conditions. As a further example, the voltage threshold may be preset upon manufacture of the device 100. If it is determined that the power level is inadequate (for example, that the power being supplied by the external power source via wiring 110 is inadequate because the voltage at wiring 110 is below the voltage threshold), at step 304 a notification may be generated and/or sent indicating an error. The notification may be, for example, displayed by the device 100, or generated via a speaker, or a data notification may be sent by the device 100, such as to another device via the external network 210. In addition to the notification or as an alternative to the notification, the device 100 may attempt to generate heat and try step 303 again.

If the power level is determined at step 303 to be adequate, at step 305 the device may activate or modify the operation of a selected component of the device 100, in order to generate heat for the target component. For example, the battery heater 106 may be activated to generate heat for the battery 105, or the clock rate for the one or more processors 201 may be ramped up (increased in clock speed) to generate additional heat as a side effect of processing, or any other component of the device 100 may be activated or its operation modified to generate additional heat.

Next, at step 306, the device 100 may determine whether the target component is being heated quickly enough. For example, after waiting a predetermined period of time from when components are activated or their operation modified at step 305, the temperature of the target component may be checked again. If the temperature of the target component is below a predetermined temperature threshold, then the target component may be considered to not be heating quickly enough, and the process may move to step 307. If the temperature of the target component is above the predetermined temperature threshold, then the target component may be considered to be heating quickly enough, and step 312 may be performed. As another example, if after the waiting period the temperature of the target component has increased from the temperature detected at step 302 by at least a predetermined amount, the target component is determined to be heating quickly enough, otherwise it is determined that the target component is not heating quickly enough.

At step 312, it may be determined whether the target component has reached a particular threshold temperature, which may be considered a normal target component operating temperature. This threshold temperature may be higher than the threshold temperature used in step 302 and step 305, and may be tested immediately after step 306 or after a further waiting period. If it is determined that the target component has reached the threshold temperature as determined in step 312, then the process may return to step 301, and the device 100 may return to normal operation. If the target component has not yet reached the threshold temperature as determined in step 312, step 312 may be repeated a number of times until the threshold temperature has been reached. After that, the process may return to step 301, which may include returning any of the selected components to their original states prior to the performance of step 305 (and/or of step 309, if performed as discussed below).

If, at step 306, the target component is determined not to be heating fast enough, then step 307 may be performed. In step 307, it may be determined again whether the power level being supplied by the battery 105 and/or the external power supply is adequate. Step 307 may be performed in the same manner as step 303. If the power level is determined to be adequate, then step 309 may be performed. Otherwise, step 308 may be performed, which may comprise an error notification being generated and sent, similar to or the same as the error notification described above with respect to step 304.

Steps 309, 310, and 311 may be repeats of steps 305, 306, and 307, respectively, and may be performed in the same or a similar way as steps 305, 306, and 307, respectively. As shown in FIG. 3, a determination in step 311 that the power level is adequate may result in the device 100 performing step 309, and a determination that the power level is not adequate may result in the device performing step 307. Thus, steps 307, 309, 310, and/or 311 may be repeated until it is determined that the target component is heating quickly enough or it is determined that the power is inadequate, resulting in either step 312 (heating fast enough) or step 308 (power level inadequate) being performed. Note that, at step 308, the error notification (which may be the same as the error notification described above with respect to step 304) may be sent only once for a single iteration of the flowchart of FIG. 3. Thus, if an error notification has already been sent in step 308, then in a next iteration of the flowchart of FIG. 3, step 308 may be skipped. The device 100 may maintain, for example, a flag indicating whether an error notification has already been sent, where the flag is set at step 304 or step 308, and the flag is reset at another step such as step 312 or step 301.

For each iteration of step 305 or step 309 (activate or modify an operation of a component or a function to generate heat), the device 100 may select a particular component of the device 100, from a plurality of components of the device 100, to be used to generate heat. The selection for each iteration may be in a predetermined order (such as in an order of a hierarchical priority of components), or the order may be dynamically determined such as based on one or more factors, e.g., the temperature of the target component, the state of charge of the battery 105, the temperature of an environment exterior to the device 100, the operating state of one or more of the components of the device 100 (for example, an amount of processing power being consumed by the one or more processors 201), the mode (e.g., state) of the device 100 (for example, whether the device 100 is in a standby state or an active state), a present and/or expected power consumption of the device 100, an amount of power presently available to the device 100, and/or the amount of heat that the various components respectively generate. For example, each of the plurality of device 100 components may be expected to generate a particular amount of heat (e.g., a rate of heat production that is different for each component).

The device 100 may select, for each iteration of step 305 or step 309, a component based on how much heat the various components are expected to produce. The amount (e.g., rate) of heat each of the various components are expected to produce may be stored in a data structure such as a look-up table that associates each of the plurality of components with an amount of heat produced by the respective component. For example, for each iteration of step 305 or step 309, the device 100 may select a component that is not already activated (e.g., not already turned on or nor already in a state of increased heat production) and that has the greatest amount of heat production as compared with the other components that are not already activated.

The order of component selection may be determined from a look-up table or other data structure that associates each of a plurality of components of the device 100 with a priority of the components and/or with one or more heating characteristics of the components. Table 1, below, presents an example of the information that may be included in such a data structure.

TABLE 1

Example Data Structure for Selecting Components to Heat Target Component

| Priority | Heating Characteristics | Component Used to Generate Heat | Action(s) |
|---|---|---|---|
| 1 | one or more characteristics of heat generated by battery heater, such as power, location, etc. | battery heater 106/214 | turn on, or increase heat |
| 2 | one or more characteristics of heat generated by infrared light, such as power, location, etc. | infrared light 111/219 | turn on, or increase light, even in daylight or other light conditions, even if not needed or suitable for imaging, and/or even if camera function is not being used |
| 3 | one or more characteristics of heat generated by processor, such as power, location, etc. | processor 201 | increase speed |
| 4 | one or more characteristics of heat generated by Wi-Fi component, such as power, location, etc. | Wi-Fi (e.g., 209) | increase transmission power (e.g., by increasing signal strength of transmitted wireless signals) and/or increase reception power (e.g., by increasing amplification of received wireless signals) |

TABLE 1-continued

Example Data Structure for Selecting Components to Heat Target Component

| Priority | Heating Characteristics | Component Used to Generate Heat | Action(s) |
|---|---|---|---|
| 5 | one or more characteristics of heat generated by speaker, such as power, location, etc. | speaker 109 | play audio sample, even if audio is not needed for another function of the device |
| 6 | one or more characteristics of heat generated by battery, such as power, location, etc. | battery 105/213 | discharge battery, for example by shifting some or all of the device's power load from the external power source to the battery |

Table 1 presents an example data structure (e.g., a look-up table) for selection of various components of the device to heat a component. Each item specifies an action to be taken, which may involve causing a change in an operating state of at least one component. The change in operating state may be made to remain in the changed state until instructed otherwise, or the change in operating state may be for a predetermined amount of time, after which the component may return to the original operating state. One or more of the components to be selected (e.g., from Table 1) may be designed to produce heat as their primary or only function. For example, one or more of the components may be a heater that is designed to convert electric current into heat. One or more of the components may be designed to perform one or more other functions that, as a result of being performed, may also cause heat to be incidentally generated. Such heat generation may be caused, for example, by inefficiencies in components utilizing electric power to perform their designed functions. As an example, the state of the battery heater 106/214 may be changed from OFF to ON, thereby generating heat as designed. As another example, the infrared light 111/219 may be changed from OFF to ON, thereby generating not only light for illumination but also some heat as a side effect. The state may be changed in a variety of ways, not necessarily limited to selecting between an OFF state and an ON state. For example, the amount of heat (or light) generated may be increased from a certain amount of heat or light to a higher amount of heat or light. The order of operations may be in any order desired. However, it may be desirable that the order prioritize those components that are least likely to affect user experience, device operation, and/or power consumption. For example, the order may prioritize using the battery heater 106/214, which may be transparent to the user, over generating sound by the speaker 109, which may be noticed by the user.

The example data structure shown in Table 1 includes a field indicating a priority of each component. The priority may be a hierarchical ordering of the components, and may be used to determine a preferred order for using the components to generate heat. For example, step 305 may involve performing the first item in the order, which is to turn on the battery heater 106/214. If step 309 is performed, step 309 may involve the next highest priority (priority 2), in which the infrared light 111/219 may be turned on. If step 309 is repeated, that repetition of step 309 may comprise performing the component associated with the next highest priority (priority 3), which in this example may be increasing the speed of the processor 201. Each subsequent iteration of step 309 may perform the next item in the order of priority, until step 309 is no longer needed (for example, if it is determined in step 310 that the target component is heating quickly enough). The item in the order of priority (also referred to herein as the order of operations) may be tracked using a pointer variable that is incremented each time step 305 or step 309 is performed. The value of the pointer variable may point to the item in the order of operations to be performed the next time step 309 is performed. The pointer variable may be reset as appropriate, such as any time prior to step 309 being performed (e.g., as part of step 302). The pointer variable and/or the heating order of operation table (or other data structure) may be stored in memory of the computing device 200, such as in the ROM 202, the RAM 203, the removable media 204, and/or the hard drive 205. The order of operations of Table 1 is merely one example. The order of operations may be in a different order, and may involve one or more additional and/or different components. If step 309 is repeated enough times that the order of operations of Table 1 are all performed and there are no further listed operations remaining, then the device 100 may present an error notification to the user (for example, indicating that one or more features of the device 100 may be unavailable) and/or the device 100 may power down or enter a reduced power standby state or a reduced function state until the battery 105 is sufficiently warm.

As discussed above, the order of operations may be dynamically determined such as based on one or more factors, e.g., the temperature of the target component, the state of charge of the battery 105, the temperature of an environment exterior to the device 100, the operating state of one or more of the components of the device 100 (for example, an amount of processing power being consumed by the one or more processors 201), the mode (e.g., state) of the device 100 (for example, whether the device 100 is in a standby state or an active state), a present and/or expected power consumption of the device 100, an amount of power presently available to the device 100, and/or the amount of heat that the various components respectively generate. For example, each of the plurality of device 100 components may be expected to generate a particular amount of heat (e.g., a rate of heat production that is different for each component) and/or to generate the heat in a particular region of the device 100. The order may be determined, in such a case, based on information in the column of Table 1 labeled "Heating Characteristics."

Another branch from the normal operation 301 may be followed if it is determined, at step 401, that a target component of the device 100 needs to be cooled (passively or actively). For example, it may be determined the battery 105 is in an overheated condition, and that the battery 105 (the target component in this example) needs to be cooled.

Figure 4:
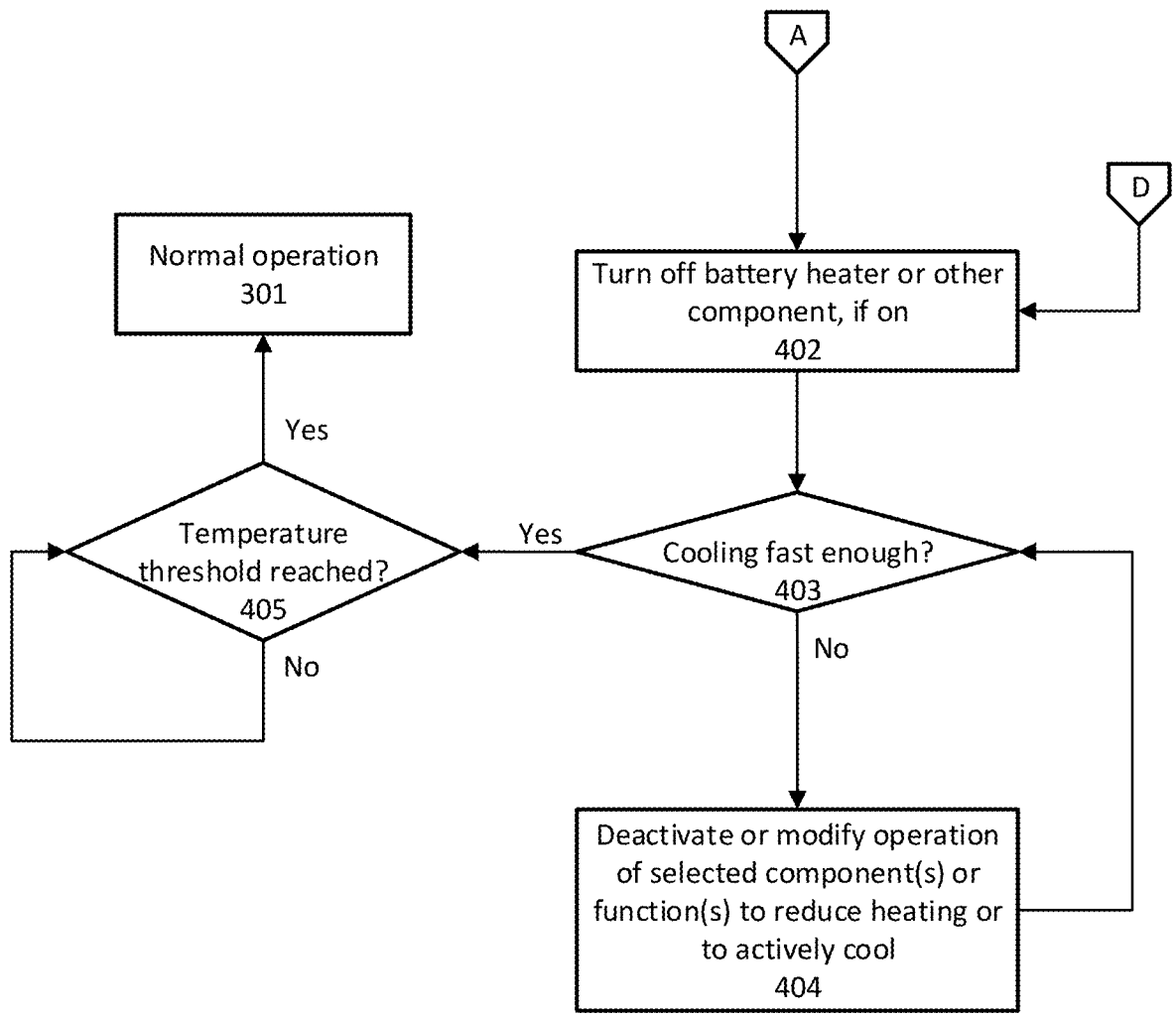
Figure 5:
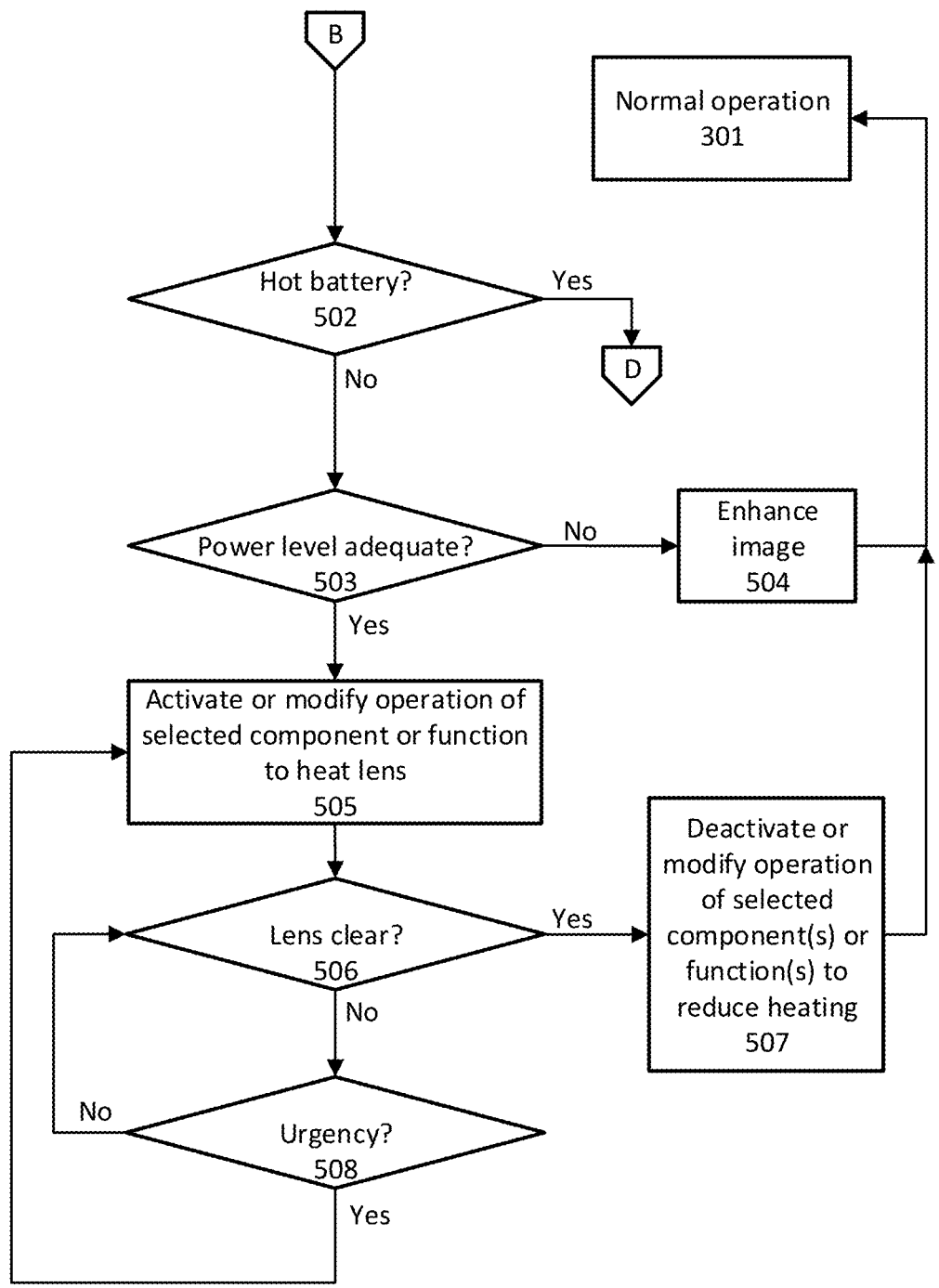
Figure 6:
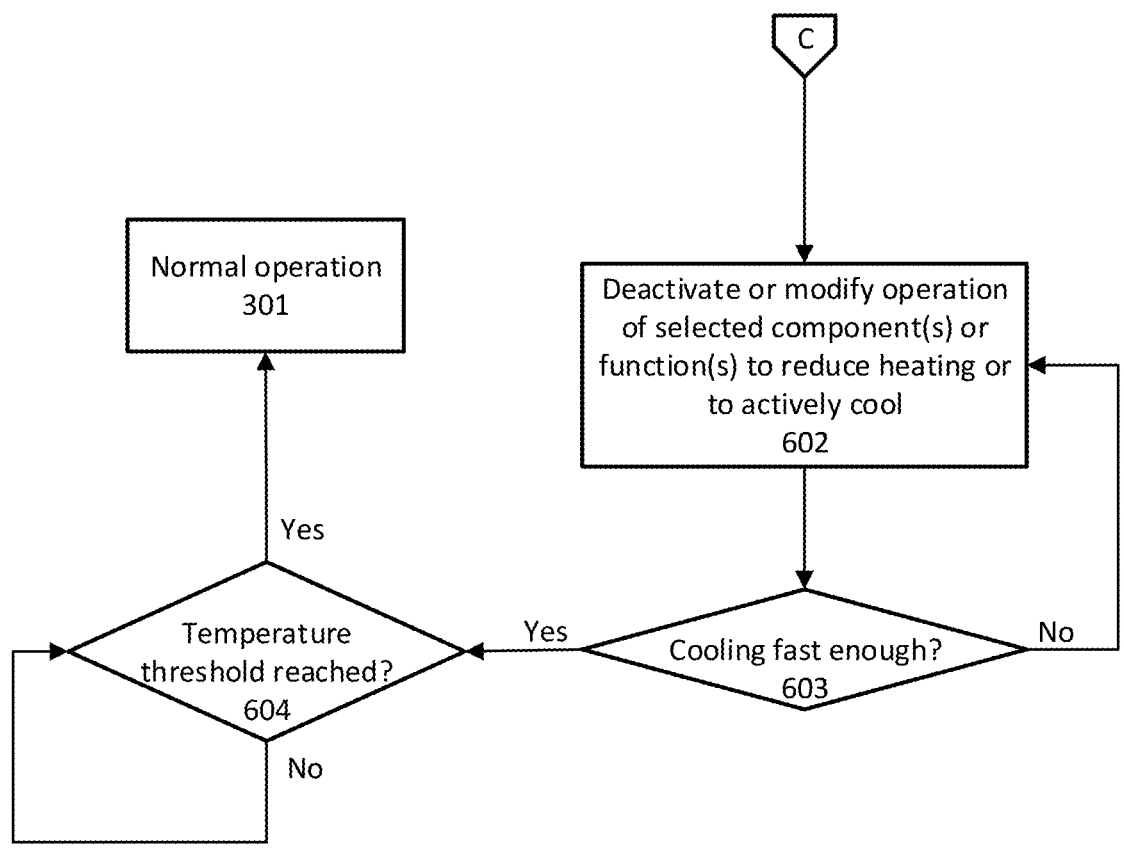

Performing step 401 may lead to the performance of the flowchart of FIG. 4, which may cause the device 100 to, for example, regulate a temperature of the target component. For example, the flowchart of FIG. 4 may cause the device 100 to cool the target component (passively or actively) if the target component is detected to be in an overheated condition. For example, the one or more sensors 217 may comprise a temperature sensor that is configured to detect a temperature of the target component. For example, if the temperature sensor measures the temperature of the target component as being above a predetermined threshold temperature), the device 100 may determine that the target component is in an overheated condition.

If it is determined at step 401 (FIG. 3) that the target component is in an overheated condition, step 402 (FIG. 4) may be performed. In step 402, the device 100 may turn off the battery heater 106, if it is already on and if the target component is the battery 105. Next, at step 403, the device 100 may determine whether the target component is being cooled quickly enough. For example, after waiting a predetermined period of time from when battery heater 105 is turned off at step 402, the temperature of the target component may be checked again. If, after the waiting period, the temperature of the battery 105 is above a predetermined temperature threshold, the target component may be considered to not be cooling quickly enough, and step 404 may be performed. If the temperature of the target component is below the predetermined temperature threshold, the target component may be considered to be cooling quickly enough, and step 405 may be performed. As another example, if after the waiting period the temperature of the battery has decreased from the temperature detected at step 401 by at least a predetermined amount, the target component may be determined to be cooling quickly enough, otherwise it is determined to not be cooling quickly enough.

At step 405, it may be determined whether the target component has dropped down to a particular threshold temperature, which may be considered a normal target component operating temperature. This threshold temperature may be lower than the threshold temperature used in step 401 and step 403, and may be tested immediately after step 403 or after a further waiting period. If the battery 105 has reached the threshold temperature as determined in step 405, the device 100 may return to normal operation in step 301. If the target component has not yet reached the threshold temperature as determined in step 405, step 405 may be repeated a number of times until the threshold temperature has been reached. After that, the device 100 may return to normal operation in step 301.

If, at step 403, the target component is determined not to be cooling quickly enough, the device 100 may in step 404 deactivate or modify the operation of a selected component of the device 100, in order to reduce the amount of heat that is being generated. For example, the clock rate for the one or more processors 201 may be decreased, or any other component of the device 100 may be deactivated or its operation modified to generate less (e.g., zero) heat. After performing step 404, step 403 may be performed.

For each iteration of step 404 (deactivate or modify an operation of a component or a function to reduce heating or to actively cool), the device 100 may select a particular component, from a plurality of components of the device 100, to be used to reduce how much heat is being generated. The selection for each iteration may be in a predetermined order, or the order may be dynamically determined such as based on one or more factors, e.g., the target component temperature, the state of charge of the battery 105, the temperature of the environment exterior to the device 100, the operating state of one or more of the components of the device 100 (for example, an amount of processing power being consumed by the one or more processors 201), the mode (e.g., state) of the device 100 (for example, whether the device 100 is in a standby state or an active state), a present and/or expected power consumption of the device 100, an amount of power presently available to the device 100, and/or the amount of heat that the various components respectively generate. For example, each component may be expected to generate a particular amount of heat (e.g., a rate of heat production that is different for each component).

The device 100 may select, for each iteration of step 404, a component based on how much heat the various components are expected to produce. The amount (e.g., rate) of heat each of the various components are expected to produce may be stored in a data structure such as a look-up table that associated each of the plurality of components with an amount of heat produced by the respective component. For example, for each iteration of step 404, the device 100 may select a component that is not already activated (e.g., not already turned on or nor already in a state of increased heat production) and that has the greatest amount of heat production as compared with the other components that are not already activated.

The order of device selection may be determined from a look-up table or other data structure that associates each of a plurality of components with an order of priority of various components and/or with one or more cooling characteristics of the components. Table 2, below, presents an example of the information that may be included in such a data structure.

TABLE 2

Example Data Structure for Selecting Components to Cool Target Component

| Priority | Cooling Characteristics | Component Used to Allow for Cooling | Action(s) |
|---|---|---|---|
| 1 | one or more characteristics of cooling that would be achieved by performing indicated action(s) on battery heater | battery heater 106/214 | turn off, or decrease heat (may be part of step 402 rather than step 404) |
| 2 | one or more characteristics of cooling that would be achieved by performing indicated action(s) on infrared light | infrared light 111/219 | turn off, or decrease light, even if it is nighttime or other dark conditions exist |

TABLE 2-continued

Example Data Structure for Selecting Components to Cool Target Component

| Priority | Cooling Characteristics | Component Used to Allow for Cooling | Action(s) |
|---|---|---|---|
| 3 | one or more characteristics of cooling that would be achieved by performing indicated action(s) on processor | processor 201 | decrease speed |
| 4 | one or more characteristics of cooling that would be achieved by performing indicated action(s) on Wi-Fi component | Wi-Fi (e.g., 209) | decrease transmission and/or reception power |
| 5 | one or more characteristics of cooling that would be achieved by performing indicated action(s) on speaker | speaker 109 | disable speaker |
| 6 | one or more characteristics of cooling that would be achieved by performing indicated action(s) on battery | battery 105/213 | stop discharging (or reduce discharge rate of) battery, for example by shifting some or all of the device's power load from the battery to the external power source |

Table 2 presents an example data structure (e.g., a look-up table) for selection of various components of the device to cool a component. Each item specifies an action to be taken, which may involve causing a change in an operating state of at least one component so as to provide for relative cooling based on the change in operating state. The change in operating state may be made to remain in the changed state until instructed otherwise, or the change in operating state may be for a predetermined amount of time, after which the component may return to the original operating state. One or more of the components to be selected (e.g., from Table 2) may be designed to produce heat as their primary or only function. For example, one or more of the components may be a heater that is designed to convert electric current into heat. One or more of the components may be designed to perform one or more other functions that, as a result of being performed, may also cause heat to be incidentally generated. Such heat generation may be caused, for example, by inefficiencies in components utilizing electric power to perform their designed functions. As an example, the state of the battery heater 106/214 may be changed from ON to OFF, thereby stopping from generating heat as designed. As another example, the infrared light 111/219 may be changed from ON to OFF, thereby stopping from generating not only light for illumination but also some heat as a side effect. The state may be changed in a variety of ways, not necessarily limited to selecting between an ON state and an OFF state. For example, the amount of heat or light generated may be decreased from a certain amount of heat or light to a smaller amount of heat or light that is greater than zero. The order of operations may be in any order desired. However, it may be desirable that the order prioritize those components that are least likely to affect user experience, device operation, and/or power consumption. For example, the order may prioritize deactivating the battery heater 106/214, which may be transparent to the user, over disabling generation of sound by the speaker 109, which may be noticed by the user.

The example data structure shown in Table 2 includes a field indicating a priority of each component. The priority may be a hierarchical ordering of the components, and may be used to determine a preferred order for using the components to provide for cooling. For example, step 404 may involve performing the first item in the order (if not already performed during step 402), which is to turn off the battery heater 106/214. The next iteration of step 404 may involve the next highest priority (e.g., the next highest order of operations) (priority 2), in which the infrared light 111/219 may be turned off. The next iteration of step 404 may cause the component having the next highest priority (priority 3) to be performed, which in this example may be decreasing the speed of the processor 201. Each subsequent iteration of step 404 may implement the next item in the indicated order of priority (e.g., in the indicated order of operations), until step 404 is no longer needed (for example, if it is determined in step 403 that the target component is cooling quickly enough). The item in the order of operations may be tracked using a pointer variable that is incremented each time step 402 or step 404 is performed. The value of the pointer variable may point to the item in the order of operation to be implemented the next time step 404 is performed. The pointer variable may be reset as appropriate, such as any time prior to step 404 being performed (e.g., as part of step 401). The pointer variable and/or the heating order of operation table (or other data structure) may be stored in memory of the computing device 200, such as in the ROM 202, the RAM 203, the removable media 204, and/or the hard drive 205. The order of operations of Table 2 is merely one example. The order of operations may be in a different order, and may involve one or more additional and/or different components. If step 404 is repeated enough times that the order of operations of Table 2 are all performed and there are no further listed operations remaining, then the device 100 may present an error notification to the user (for example, indicating that one or more features of the device 100 may be unavailable) and/or the device 100 may power down or enter a reduced power standby state or a reduced function state until the target component has sufficiently cooled.

As discussed above, the order of operations for cooling may be dynamically determined such as based on one or more factors, e.g., the temperature of the target component, the state of charge of the battery 105, the temperature of an environment exterior to the device 100, the operating state of one or more of the components of the device 100 (for example, an amount of processing power being consumed by the one or more processors 201), the mode (e.g., state) of the device 100 (for example, whether the device 100 is in a standby state or an active state), a present and/or expected power consumption of the device 100, an amount of power presently available to the device 100, and/or the amount of heat that the various components respectively generate. For example, each of the plurality of device 100 components may be expected to generate a particular amount of heat (e.g., a rate of heat production that is different for each component) and/or to generate the heat in a particular region of the device 100. The order may be determined, in such a case, based on information in the column of Table 2 labeled "Cooling Characteristics."

Figure 7:
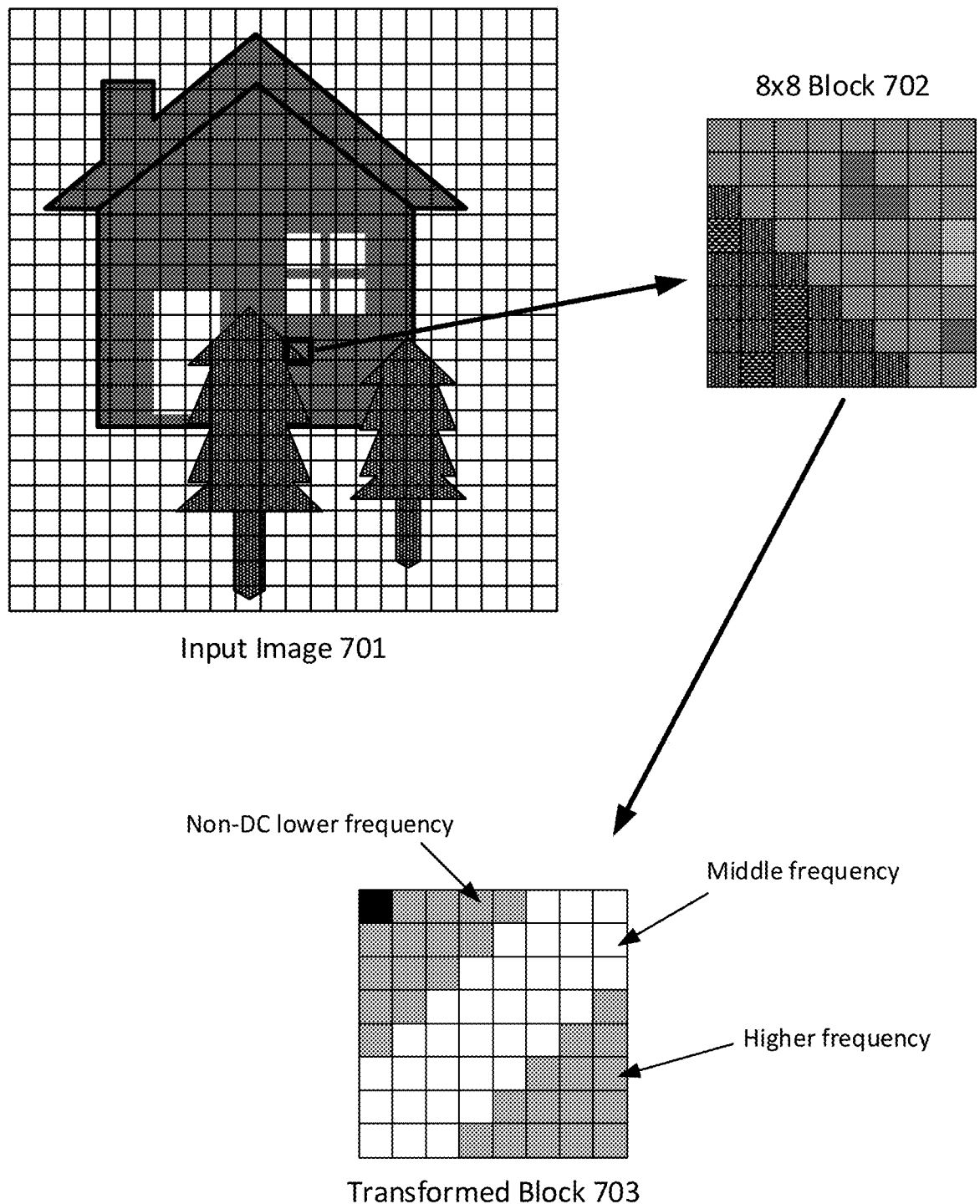
FIG. 7 is an example illustration of cosine transformation image analysis for determining a foggy state of a lens.

Another branch from the state of normal operation 301 may be followed if it is determined, at step 501, that the lens 102 is in a foggy condition. For example, the device 100 may determine that the lens 102 is at least partially fogged. Performing step 501 may lead to the performance of the flowchart of FIG. 5, which may cause the device 100 to, for example, defog the lens 102. While defogging the lens 102 is discussed with respect to FIG. 5, any other components of the device 100 may be heated for defogging or other purposes using the same or a similar process. At step 501 (FIG. 3), the device 100 may detect that the lens 102 is in a foggy condition, such as where the interior surface 102a of the lens 102 is covered in condensation. For example, the device 100 may detect the foggy condition by analyzing an image generated based on light received by the image sensor 104 via the lens 102. For example, the device 100 may perform a cosine transformation (for example, a discrete cosine transform (DCT)) of the received image into the frequency domain, and analyze the amount of higher frequency information present in the transformed image. A cosine transformation may express image data as a series (sum) of cosine functions, each cosine function being at a different frequency and each cosine function having a different coefficient. The device may determine that a foggy condition is present based on the higher-frequency coefficients dropping below a threshold value or based on the higher-frequency coefficients dropping by at least a threshold amount from a prior baseline received image. The transformation may be performed of the entire received image or only one or more portions of the received image, and may be performed on a plurality of sub-units (e.g., blocks) of the image. An example of how cosine transformation may be used to analyze an image is shown with respect to FIG. 7. In the example FIG. 7, an input image 701 (which may be the image as received by the image sensor 104), may be subdivided into a plurality of portions, referred to herein as blocks. Each block in the example of FIG. 7 may be a block of 8 pixels high by 8 pixels wide. However, any other block size may be used. An example of one of those blocks is shown as block 702. The block 703 shown at the bottom of FIG. 7 is an example of a visual representation of a transformed block 703 resulting from the cosine transformation of the block 702. While the input image 701 and each of its blocks (e.g., block 702) are spatial block (in other words, each pixel/value is distributed spatially and represents a different location in a two-dimensional space), the transformed block 703 may be in the frequency domain (in other words, each pixel/value represents a different frequency or frequency bin). This transformation may be repeated for each block of the input image 701. This transformed block, as shown, may be arranged by frequency. The transform of each block of input image 701 into a transformed block (such as transformed block 703) may take the two-dimensional spatial representation of the input image block (e.g., the pixels) such as block 702, and may convert that block 702 into a two-dimensional representation in the frequency domain (as indicated for example by transformed block 703). This type of transformation may result in compressing the input image block (e.g., block 702) into a block (e.g., block 703) having fewer total bits of information, or as a standalone process that may or may not perform compression and may be used solely to determine if there is fog on the lens. The transformed block 703 may represent a plurality of different frequency bins (ranges), where the value for each frequency bin may be represented as a value. The higher the value, the more details in the image within that frequency bin. In the shown example of FIG. 7, a darker shade may indicate a larger value for a particular frequency bin, and a lighter shade may indicate a relatively smaller value for a particular frequency bin. For example, as the labels and shading of the example in FIG. 7 show, the frequency may increase from the upper left of the block toward the lower-right (however, the direction of frequency increase may differ from that shown). For example, the upper-most/left-most block may represent a lowest frequency bin (represented with a relatively dark shade and thus a relatively high value), and the lower-most/right-most block may represent a highest frequency bin (represented with a medium shade and thus a medium value). The middle frequencies have a still lighter shade and thus have relatively lower values. The higher frequency values may have higher numbers when there are more fine details in the original spatial block 702. and lower values when there is less fine detail. Thus, for example, a flat white block in an original spatial input image block may have high values for every value (pixel), for example the value 255, each representing the color white. After a transformation into the corresponding frequency domain transformed block, only the very upper-left value (lowest frequency bin) would have a significant value and the rest of the values would be zero or nearly zero. Such a transformed pattern would mean there is very little detail in the original spatial image block, potentially meaning that the lens 102 has condensation blocking the detail that used to be seen. While the cosine transformation is discussed herein, other spatial-to-frequency transformations may be performed, such as the fast-Fourier transform (FFT).

In further examples, a foggy condition may be determined to exist based on a correlation of the brightness, color, hue, and/or characteristic of neighboring pixels or other image sub-units in the received image. For example, it may be determined that a foggy condition exists based on many pixels having a high correlation to neighboring pixels. For example, the foggy condition may be determined to exist based on the correlation exceeding a threshold correlation. In a detailed image, it may be expected that a non-foggy lens will allow the received image to have lower correlations between neighboring pixels as compared to a foggy lens.

In yet further examples, a current or recent received image may be directly compared with one or more prior received images, and the differences may be analyzed to determine the extent of the loss of detail in the current or recent image as compared with the one or more prior images.

In yet further examples, the device 100 may analyze the received image to detect one or more large areas of a light color (e.g., white) in the received image. The device 100 may determine that a foggy condition exists based on detecting one or more such large areas. The one or more large areas may, at an earlier time, have included multiple colors during the daytime or multiple shades during the nighttime.

In yet further examples, the device 100 may implement artificial intelligence (AI) or other machine learning to train image recognition of a foggy condition. Any of the above-described example methods for detecting a foggy condition may be detected may be used individually or in combination with one or more of the other above described example methods for detecting a foggy condition, and/or in combination with other methods for detecting a foggy condition.

Returning to FIG. 5, based on detecting a foggy lens condition in step 501, the device 100 may determine whether the battery 105 is hot. For example, the temperature of the battery 105 may be compared with a temperature threshold. If the battery temperature is less than the temperature threshold, the battery 105 may be considered not hot. If the battery temperature is greater than the temperature threshold, the battery 105 may be considered hot. If the battery 105 is considered hot, the battery may be cooled by performing step 402 of FIG. 4. If the battery is sufficiently cooled and the device returns to normal operation at step 301, the device 100 may again initiate step 501 (detecting foggy lens condition) and again begin performing the steps of FIG. 5.

If the battery 105 is considered not to be hot at step 502, the device 100 may in step 503 determine whether the power level being provided by the battery 105 and/or an external power supply (such as being received via the wiring 110) is adequate for any tasks that the device 100 is performing, attempting to perform, or expects to perform. For example, the device 100 may determine whether the power level is adequate to perform one or more of the steps 505-508. Or, for example, the device 100 may need to operate a camera or it may expect to send a signal to a doorbell ringer. The power level may be measured based on, for example, the current and/or voltage being supplied by the battery and/or external power supply. For example, if the current drops below a particular threshold associated with the tasks being performed by the device 100, the device 100 may determine that the power being supplied is inadequate. If the device determines that the power level is not adequate at step 503, the device 100 may in step 504 enhance the received image using one or more image enhancement techniques, after which step 301 may be repeated. Step 504 may further involve enhancing additional images that are received, such as over a period of time such as the next minute, or the next ten minutes, or any other time period.

If the device 100 determines that the power level is adequate at step 503, the device 100 may in step 505 activate or modify the operation of a selected component of the device 100, in order to generate heat for the lens 102. For example, the lens heater 107 may be activated, or the clock rate for the one or more processors 201 may be ramped up (increased in clock speed) to generate additional heat as a side effect of processing, or any other component of the device 100 may be activated or its operation modified to generate additional heat that may act to heat the lens 102.

Based on performing step 505, the device 100 may in step 506 determine whether the lens is clear. Step 506 may comprise the same or similar analysis as step 501. For example, the device 100 may perform a cosine transformation of an image. Based on the analysis of the cosine transformation (and/or based on other analysis of the received image), the device 100 may determine that the lens remains in a foggy condition or has changed to a clear condition (e.g., a non-foggy condition). If the lens is determined to be clear, one, some, or all of the components that were activate or modified at step 505 may in step 507 be returned to their original activation and/or operating states. Based on performing step 507, step 301 may be performed.

If the device 100 determines that the lens is not clear (e.g., is still in a foggy condition), the device 100 may in step 508 determine whether it is urgent that the lens become clear. The urgency may be determined based on one or more factors, such as the time of day, the day of week, whether movement has been detected (e.g., in comparison with one or more previous received images), and/or one or more user preferences such as stored in a user profile. For example, a user profile stored in memory of the device 100 may indicate that, during a first time period (e.g., one or more days of the week and/or one or more timeframes within a day), it is urgent that the lens be clear. The user profile may additionally or alternatively indicate that, during a second time period (e.g., one or more days of the week and/or one or more timeframes within a day), it is not urgent that the lens be clear. The indication of urgency in the user profile may be a direct indication of urgency, or the indication may be an indication associated with another preference, such as a timeframe that is otherwise important to the user. For example, the user may designate important, sensitive, or other special timeframes, and the device 100 may interpret those timeframes as being associated with an urgency to defog (clear) the lens 102. As a further example, if the device 100 determines that motion has been detected, it may be considered urgent that the lens 102 be made clear (e.g., be defogged).

If, at step 508, it is determined that it is not urgent that the lens 102 be clear, the process moves back to implement step 506 and determines again whether the lens is clear. Steps 506 and/or 508 may include a waiting period before making its respective determination. If, at step 508, it is determine that it is urgent that the lens 102 be clear, the device 100 may in step 505 activate or modify the operation of another selected component, to provide additional heating for the lens 102.

For each iteration of step 505 (activate or modify an operation of a component or a function to generate heat for the lens), the device 100 may select a particular component, from a plurality of components, to be used to generate heat for the lens. The selection for each iteration may be in a predetermined order, or the order may be dynamically determined such as based on one or more factors, e.g., the lens temperature, the temperature of the environment exterior to the device 100, the operating state of one or more of the components of the device 100 (for example, an amount of processing power being consumed by the one or more processors 201, the mode (e.g., state) of the device 100 (for example, whether the device 100 is in a standby state or an active state), a present and/or expected power consumption of the device 100, an amount of power presently available to the device 100, and/or the amount of heat that the various components respectively generate. For example, each component may be expected to generate a particular amount of heat (e.g., a rate of heat production that is different for each component).

The device 100 may select, for each iteration of step 505, a component based on how much heat the various components are expected to produce. The amount (e.g., rate) of heat each of the various components are expected to produce may be stored in a data structure such as a look-up table that associated each of the plurality of components with an amount of heat produced by the respective component. For example, for each iteration of step 505, the device 100 may select a component that is not already activated (e.g., not already turned on or nor already in a state of increased heat production) and that has the greatest amount of heat production as compared with the other components that are not already activated.

The order of component selection may be determined from a look-up table or other data structure that associates each of a plurality of components with a priority of various components and/or with one or more heating characteristics of the components. Table 3, below, presents an example of the information that may be included in such a data structure.

be made to remain in the changed state until instructed otherwise, or the change in operating state may be for a predetermined amount of time, after which the component may return to the original operating state. One or more of the components to be selected (e.g., from Table 3) may be designed to produce heat as their primary or only function. For example, one or more of the component may be a heater that is designed to convert electric current into heat. One or more of the components may be designed to perform one or more other functions that, as a result of being performed, may also cause heat to be incidentally generated. Such heat generation may be caused, for example, by inefficiencies in components utilizing electric power to perform their designed functions. As an example, the state of the battery heater 106/214 may be changed from OFF to ON, thereby generating heat as designed. As another example, the infrared light 111/219 may be changed from OFF to ON, thereby generating not only light for illumination but also some heat as a side effect. The state may be changed in a variety of ways, not necessarily limited to selecting between an OFF state and an ON state. For example, the amount of heat (or light) generated may be increased from a certain amount of heat or light to a higher amount of heat or light. The order

TABLE 3

Example Data Structure for Selecting Components to Heat Lens

| Priority | Heating Characteristics | Component Used to Generate Heat | Action(s) |
|---|---|---|---|
| 1 | one or more characteristics of heat generated by battery heater, such as power, location, etc. | lens heater 107/214 | turn on, or increase heat |
| 2 | one or more characteristics of heat generated by infrared light, such as power, location, etc. | infrared light 111/219 | turn on, or increase light, even if it is daylight or other bright light conditions exist |
| 3 | one or more characteristics of heat generated by processor, such as power, location, etc. | processor 201 | increase speed |
| 4 | one or more characteristics of heat generated by Wi-Fi component, such as power, location, etc. | Wi-Fi (e.g., 209) | increase transmission and/or reception power |
| 5 | one or more characteristics of heat generated by speaker, such as power, location, etc. | speaker 109 | play audio sample, even if audio is not needed for another function of the device |
| 6 | one or more characteristics of heat generated by battery, such as power, location, etc. | battery 105/213 | discharge battery, for example by shifting some or all of the device's power load from the external power source to the battery |

Table 3 presents an example data structure (e.g., a look-up table) for selection of various components of the device to heat the lens 102. Each item specifies an action to be taken, which may involve causing a change in an operating state of at least one component. The change in operating state may of operations may be in any order desired. However, it may be desirable that the order prioritize those components that are least likely to affect user experience, device operation, and/or power consumption. For example, the order may prioritize using the lens heater 107/214, which may be transparent to the user, over generating sound by the speaker 109, which may be noticed by the user.

The example data structure shown in Table 3 includes a field indicating a priority of each component. The priority may be a hierarchical ordering of the components, and may be used to determine a preferred order of operations for using the components to generate heat. For example, step 505 may involve performing the first item in the order, which is to turn on the lens heater 107/214. If step 505 is performed again (e.g., as a second iteration), step 505 may involve the next highest priority (priority 2), in which the infrared light 111/219 may be turned on. The next iteration of step 505 may cause an operation associated with the next highest priority (priority 3) to be performed, which in this example may be increasing the speed of the processor 201. Each subsequent iteration of step 505 may cause performance of the next item in the order of priority, until step 505 is no longer needed (for example, if it is determined in step 506 that the lens is clear, or that it is not urgent to clear the lens as determined in step 508). The item in the order of priority may be tracked using a pointer variable that is incremented each time step 505 is performed. The value of the pointer variable may point to the item in the order of operation to be implemented the next time step 505 is performed. The pointer variable may be reset as appropriate, such as any time prior to step 505 being performed (e.g., as part of step 501). The pointer variable and/or the heating order of operation table (or other data structure) may be stored in memory of the computing device 200, such as in the ROM 202, the RAM 203, the removable media 204, and/or the hard drive 205. The order of operations of Table 3 is merely one example. The order of operations may be in a different order, and may involve one or more additional and/or different components. For example, if there is no lens heater, the first operation may be to activate the infrared light 111/219 or to increase the speed of the one or more processors 201. If step 505 is repeated enough times that the order of operations of Table 3 are all performed and there are no further listed operations remaining, then the device 100 may present an error notification to the user (for example, indicating that its camera functionality may be unavailable) and/or may temporarily disable its camera.

As discussed above, the order of operations may be dynamically determined such as based on one or more factors, e.g., the temperature of the target component, the state of charge of the battery 105, the temperature of an environment exterior to the device 100, the operating state of one or more of the components of the device 100 (for example, an amount of processing power being consumed by the one or more processors 201), the mode (e.g., state) of the device 100 (for example, whether the device 100 is in a standby state or an active state), a present and/or expected power consumption of the device 100, an amount of power presently available to the device 100, and/or the amount of heat that the various components respectively generate. For example, each of the plurality of device 100 components may be expected to generate a particular amount of heat (e.g., a rate of heat production that is different for each component) and/or to generate the heat in a particular region of the device 100. The order may be determined, in such a case, based on information in the column of Table 3 labeled "Heating Characteristics."

Another branch from the normal operation 301 may be followed if it is determined, at step 601, that the image sensor 104 is overheated. Step 601 may be considered a special case of step 401 (determine that cooling is needed), where the target component to be cooled is the image sensor 601. Performing step 601 may lead to the performance of the flowchart of FIG. 6, which may cause the device 100 to, for example, cool the image sensor 104. While cooling the image sensor 104 is discussed with respect to FIG. 6, any other components of the device 100 may be cooled using the same or a similar process. At step 601 (FIG. 3), the device 100 may detect that the image sensor 104 is overheated. For example, one or more temperature sensors may detect the temperature of the image sensor 104, and the device 100 may determine that the image sensor 104 is overheated based on the temperature of the image sensor 104 being greater than a threshold temperature. The image sensor 104 may be overheated for a variety of reasons. For example, the image sensor 104 may become overheated if the sun is shining onto the device 100, or if the lens heater 107 is used for an extended period of time, or if one or more other components of the device 100 generate excessive heat. If the device 100 determines that the image sensor 104 is overheated, the device 100 may in step 601 deactivate or modify operation of one or more selected components of the device 100, in order to allow the image sensor 104 to cool over time. After one or more selected components are deactivated or modified to allow for image sensor 104 cooling, the device 100 may in step 603 determine whether the image sensor 104 is cooling quickly enough. For example, after waiting a predetermined period of time from implementing step 602, the temperature of the image sensor 104 may be checked again. If, after the waiting period, the temperature of the image sensor 104 is above a predetermined temperature threshold, the image sensor 104 may be considered to not be cooling quickly enough, and the device 100 may repeat step 602 to deactivate or modify another component of the device 100. If the temperature of the image sensor 104 is below the predetermined temperature threshold, the image sensor 104 may be considered to be cooling quickly enough, and the device 100 may perform step 604. As another example, if after the waiting period the temperature of the image sensor 104 has decreased from the temperature detected at step 601 by at least a predetermined amount, the image sensor 104 is determined to be cooling quickly enough, otherwise it is determined to not be cooling quickly enough.

At step 604, the device may determine whether a temperature of the image sensor 104 has dropped down to at least a particular threshold temperature, which may be considered a normal image sensor operating temperature range. This threshold temperature may be lower than the threshold temperature used in step 601, and may be tested immediately after step 603 or after a further waiting period. If the image sensor 104 has reached the threshold temperature as determined in step 604, the device 100 may return to normal operation in step 301. If the image sensor 104 has not yet reached the threshold temperature as determined in step 604, step 604 may be repeated a number of times until the threshold temperature has been reached. After that, step 301 may be repeated.

For each iteration of step 602 (deactivate or modify an operation of a component or a function to reduce heating or to actively cool), the device 100 may select a particular component, from a plurality of components, to be used to reduce how much heat is being generated. The selection for each iteration may be in a predetermined order, or the order may be dynamically determined such as based on one or more factors, e.g., the image sensor 104 temperature, the lens 102 temperature, the temperature of the environment exterior to the device 100, the operating state of one or more of the components of the device 100 (for example, an amount of processing power being consumed by the one or more processors 201), the mode (e.g., state) of the device 100 (for example, whether the device 100 is in a standby state or an active state), a present and/or expected power consumption of the device 100, an amount of power presently available to the device 100, and/or the amount of heat that the various components respectively generate. For example, each component may be expected to generate a particular amount of heat (e.g., a rate of heat production that is different for each component).

The device 100 may select, for each iteration of step 602, a component based on how much heat the various components are expected to produce. The amount (e.g., rate) of heat each of the various components are expected to produce may be stored in a data structure such as a look-up table that associated each of the plurality of components with an amount of heat produced by the respective component. For example, for each iteration of step 602, the device 100 may select a component that is not already activated (e.g., not already turned on or nor already in a state of increased heat production) and that has the greatest amount of heat production as compared with the other components that are not already activated.

The order of component selection may be determined from a look-up table or other data structure that associates each of a plurality of components with a priority of various components and/or with one or more cooling characteristics of the components. Table 4, below, presents an example of the information that may be included in such a data structure.

Table 4 presents an example data structure for selection of various components of the device to cool the image sensor 104. Each item specifies an action to be taken, which may involve causing a change in an operating state of at least one component. The change in operating state may be made to remain in the changed state until instructed otherwise, or the change in operating state may be for a predetermined amount of time, after which the component may return to the original operating state. One or more of the components to be selected (e.g., from Table 4) may be designed to produce heat as their primary or only function. For example, one or more of the component may be a heater that is designed to convert electric current into heat. One or more of the components may be designed to perform one or more other functions that, as a result of being performed, may also cause heat to be incidentally generated. Such heat generation may be caused, for example, by inefficiencies in components utilizing electric power to perform their designed functions. As an example, the state of the battery heater 106/214 may be changed from ON to OFF, thereby stopping from generating heat as designed. As another example, the infrared light 111/219 may be changed from ON to ONOFF thereby stopping generating not only light for illumination but also some heat as a side effect. The state may be changed in a variety of ways, not necessarily limited to selecting between an OFF state and an ON state. For example, the amount of heat or light generated may be decreased from a certain amount of heat or light to a smaller amount of heat or light that is greater than zero. The order of operations may be in any order desired. However, it may be desirable that the

TABLE 4

Example Data Structure for Selecting Components to Cool Image Sensor

| Priority | Cooling Characteristics | Component Used to Allow for Cooling | Action(s) |
|---|---|---|---|
| 1 | one or more characteristics of heat generated by lens heater, such as power, location, etc. | lens heater 107/214 | turn off, or decrease heat |
| 2 | one or more characteristics of heat generated by infrared light, such as power, location, etc. | infrared light 111/219 | turn off, or decrease light, even if it is nighttime or other dark conditions exist |
| 3 | one or more characteristics of heat generated by processor, such as power, location, etc. | processor 201 | decrease speed |
| 4 | one or more characteristics of heat generated by Wi-Fi component, such as power, location, etc. | Wi-Fi (e.g., 209) | decrease transmission and/or reception power |
| 5 | one or more characteristics of heat generated by speaker, such as power, location, etc. | speaker 109 | disable speaker |
| 6 | one or more characteristics of heat generated by battery, such as power, location, etc. | battery 105/213 | stop discharging (or reduce discharge rate of) battery, for example by shifting some or all of the device's power load from the battery to the external power source | order prioritize those components that are least likely to affect user experience, device operation, and/or power consumption. For example, the order may prioritize deactivating the lens heater 107/214 or the infrared light 111/219, which may be transparent to the user or which may be unnecessary when the image sensor 104 is overheated, over disabling generation of sound by the speaker 109, which may be noticed by the user.

The example data structure shown in Table 4 includes a field indicating a priority of each component. The priority may be a hierarchical ordering of the components, and may be used to determine a preferred order for using the components to provide for cooling. For example, step 602 may involve performing the first item in the order, which is to turn off the lens heater 107/214. The next iteration of step 602 may comprise causing performance of the next highest priority (priority 2), in which the infrared light 111/219 may be turned off. The next iteration of step 404 may cause the next highest priority, or order of operation (priority 3) to be performed, which in this example may be decreasing the speed of the processor 201. Each subsequent iteration of step 602 may cause performance the next item in the priority order (also referred to herein as the order of operations), until step 602 is no longer needed (for example, if it is determined in step 403 that the image sensor 104 is cooling quickly enough). The item in the order of operations may be tracked using a pointer variable that is incremented each time step 602 is performed. The value of the pointer variable may point to the item in the order of operation to be implemented the next time step 602 is performed. The pointer variable may be reset as appropriate, such as any time prior to step 602 being performed (e.g., as part of step 601). The pointer variable and/or the heating order of operation table (or other data structure) may be stored in memory of the computing device 200, such as in the ROM 202, the RAM 203, the removable media 204, and/or the hard drive 205. The order of operations of Table 4 is merely one example. The order of operations may be in a different order, and may involve one or more additional and/or different components. If step 602 is repeated enough times that the order of operations of Table 4 are all performed and there are no further listed operations remaining, then the device 100 may present an error notification to the user (for example, indicating that its camera functionality may be unavailable) and/or may temporarily disable its camera.

As discussed above, the order of operations may be dynamically determined such as based on one or more factors, e.g., the temperature of the target component, the state of charge of the battery 105, the temperature of an environment exterior to the device 100, the operating state of one or more of the components of the device 100 (for example, an amount of processing power being consumed by the one or more processors 201), the mode (e.g., state) of the device 100 (for example, whether the device 100 is in a standby state or an active state), a present and/or expected power consumption of the device 100, an amount of power presently available to the device 100, and/or the amount of heat that the various components respectively generate. For example, each of the plurality of device 100 components may be expected to generate a particular amount of heat (e.g., a rate of heat production that is different for each component) and/or to generate the heat in a particular region of the device 100. The order may be determined, in such a case, based on information in the column of Table 4 labeled "Cooling Characteristics."

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a computing device, that a camera lens of the computing device is at least partially fogged;
   based on the determining that the camera lens is at least partially fogged, heating the camera lens by causing a change in an operation state of a first component of the computing device; and
   based on a further determination that the heated camera lens remains at least partially fogged after heating the camera lens:
       selecting a second component of a plurality of components of the computing device, wherein the plurality of components comprise components that are each configured to perform one or more of functions of the computing device; and
       further heating the camera lens by causing a change in an operation state of the selected second component.

2. The method of claim 1, wherein the second component comprises a processor, and wherein the causing the operation state of the second component to change comprises causing a clock speed of the processor to increase.

3. The method of claim 1, wherein the second component comprises a light source configured to illuminate a region outside of the computing device with infrared light, and wherein the causing the operation state of the second component to change comprises causing the light source to turn on.

4. The method of claim 1, wherein the determining that the camera lens is at least partially fogged comprises:
   determining an image based on light received via the camera lens; and
   determining based on the image, that the camera lens is at least partially fogged.

5. The method of claim 1, wherein each of the first component and the second component is a component selected from a different one of the following components of the computing device:
   a lens heater;
   a light source configured to illuminate a region outside the computing device with infrared light;
   a processor; or
   a speaker.

6. A method comprising:
   determining that a lens of a computing device is at least partially fogged; and
   based on the determining that the lens is at least partially fogged, generating heat for the lens by causing a change in an operation state of a first component of the computing device, wherein the first component has a functionality that is a non-heating functionality, and wherein the first component comprises one of:
       a component configured to perform a processing function and that causes the change in the operation state by causing a processing speed to increase,
       a component configured to perform an illumination function and that causes the change in the operation state by causing a region outside the computing device to be illuminated, a component configured to perform a wireless communication function and that causes the change in the operation state by causing a wireless transmission power of the computing device to increase, or a component configured to perform a user interface function and that causes the change in the operation state by causing at least one of illumination or sound to be generated.

7. The method of claim 6, wherein the first component is configured to perform the processing function, and wherein the causing the change in the operation state of the first component comprises causing the processing speed to increase.

8. The method of claim 6, wherein the first component is configured to perform the illumination function, and wherein the causing the change in the operation state of the first component comprises causing the region outside the computing device to be illuminated.

9. The method of claim 6, wherein the first component is configured to perform the wireless communication function, and wherein the causing the change in the operation state of the first component comprises causing the wireless transmission power of the computing device to increase.

10. The method of claim 6, wherein the first component is configured to perform the user interface function, and wherein the causing the change in the operation state of the first component comprises causing at least one of illumination or sound to be generated.

11. A method comprising:
determining an image based on light received via a lens of a computing device;
determining, based on the image, that the lens is at least partially fogged; and
based on the determining that the lens is at least partially fogged, generating heat for the lens by causing a change in an operation state of a first component of the computing device, wherein the first component has a functionality that is a non-heating functionality.

12. The method of claim 11, wherein the determining, based on the image, that the lens is at least partially fogged comprises:
determining, based on a cosine transformation of at least a portion of the image, that the lens is at least partially fogged.

13. The method of claim 11, wherein the first component is configured to perform a processing function, and wherein the causing the change in the operation state of the first component comprises causing a processing speed to increase.

14. The method of claim 11, wherein the first component is configured to perform an illumination function, and wherein the causing the change in the operation state of the first component comprises causing a region outside the computing device to be illuminated.

15. The method of claim 11, wherein the first component is configured to perform a wireless communication function, and wherein the causing the change in the operation state of the first component comprises causing a wireless transmission power of the computing device to increase.

16. A method comprising:
determining that a lens of a computing device is at least partially fogged;
selecting a first component of the computing device, from a plurality of components of the computing device, based on an indication of an amount of heat that the first component generates; and
based on the determining that the lens is at least partially fogged, generating heat for the lens by causing a change in an operation state of the first component, wherein the first component has a functionality that is a non-heating functionality.

17. The method of claim 16, wherein the first component is configured to perform a processing function, and wherein the causing the change in the operation state of the first component comprises causing a processing speed to increase.

18. The method of claim 16, wherein the first component is configured to perform an illumination function, and wherein the causing the change in the operation state of the first component comprises causing a region outside the computing device to be illuminated.

19. The method of claim 16, wherein the first component is configured to perform a wireless communication function, and wherein the causing the change in the operation state of the first component comprises causing a wireless transmission power of the computing device to increase.

20. A method comprising:
determining, by a camera, that a component of the camera is to be heated; and
based on the determination, heating the component by increasing an operating speed of a processor.

21. The method of claim 20, wherein the component comprises a lens.

22. The method of claim 20, further comprising additionally heating the component by increasing a power of wireless transmission by the camera.

23. The method of claim 20, wherein the determining that the component is to be heated comprises:
determining, based on light received via a lens of the camera, an image; and
determining, based on the image, that the component is to be heated.

24. An apparatus comprising:
a plurality of components that are each configured to perform one or more of functions of the apparatus, wherein the plurality of components comprises one or more processors;
memory storing instructions; and
a camera lens,
wherein the instructions, when executed by the one or more processors, cause the apparatus to:
determine that the camera lens is at least partially fogged;
based on determining that the camera lens is at least partially fogged, heat the camera lens by causing a change in an operation state of a first component of the plurality of components; and
based on a further determination that the heated camera lens remains at least partially fogged after heating the camera lens:
select a second component of the plurality of components; and
further heat the camera lens by causing a change in an operation state of the selected second component.

25. The apparatus of claim 24, wherein the first component comprises a heater configured to apply heat to the camera lens, and the second component is configured to perform at least one of a data processing function, an illumination function, a wireless communication function, or a user interface function.

26. The apparatus of claim 24, wherein the second component comprises at least one processor of the one or more processors, and wherein the causing the change in the operation state of the second component comprises causing a clock speed of the at least one processor to increase.

27. The apparatus of claim 24, wherein the second component comprises a light source configured to illuminate a region outside of the apparatus with infrared light, and wherein the causing the change in the operation state of the second component comprises causing the light source to turn on.

28. An apparatus comprising:
a plurality of components comprising one or more processors;
memory storing instructions; and
a lens,
wherein the instructions, when executed by the one or more processors, cause the apparatus to:
determine an image based on light received via the lens;
determine, based on the image, that the lens is at least partially fogged; and
based on determining that the lens is at least partially fogged, generate heat for the lens by causing a change in an operation state of a first component of the plurality of components, wherein the first component has a functionality that is a non-heating functionality.

29. The apparatus of claim 28, wherein the first component comprises at least one processor of the one or more processors, and wherein the causing the change in the operation state of the first component comprises causing a processing speed of the at least one processor to increase.

30. The apparatus of claim 28, wherein the first component is comprises a light source, and wherein the causing the change in the operation state of the first component comprises causing the light source to illuminate a region outside the apparatus.

31. The apparatus of claim 28, wherein the first component is configured to perform a wireless communication function, and wherein the causing the change in the operation state of the first component comprises causing a wireless transmission power of the first component to increase.

32. An apparatus comprising:
a plurality of components comprising one or more processors;
memory storing instructions; and
a lens,
wherein the instructions, when executed by the one or more processors, cause the apparatus to:
determine that the lens is at least partially fogged;
select a first component, from the plurality of components, based on an indication of an amount of heat that the first component generates; and
based on determining that the lens is at least partially fogged, generate heat for the lens by causing a change in an operation state of the first component, wherein the first component has a functionality that is a non-heating functionality.

33. The apparatus of claim 32, wherein the first component comprises at least one processor of the one or more processors, and wherein the causing the change in the operation state of the first component comprises causing a processing speed of the at least one processor to increase.

34. The apparatus of claim 32, wherein the first component is configured to perform a wireless communication function, and wherein the causing the change in the operation state of the first component comprises causing a wireless transmission power of the first component to increase.

35. A camera comprising:
a lens;
one or more processors; and
memory storing instructions,
wherein the instructions, when executed by the one or more processors, cause the camera to:
determine that the lens is to be heated; and
based on determining that the lens is to be heated, heat the lens by causing an operating speed of at least one processor, of the one or more processors, to increase.

36. The camera of claim 35, further comprising:
a speaker,
wherein the instructions, when executed by the one or more processors, further cause the camera to additionally heat the lens by playing audio via the speaker.

37. The camera of claim 35, further comprising:
a wireless communication unit,
wherein the instructions, when executed by the one or more processors, cause the camera to additionally heat the lens by increasing a wireless transmission power of the wireless communication unit.

\* \* \* \* \*